United States Patent [19]
Sallas et al.

[11] Patent Number: 4,766,576
[45] Date of Patent: Aug. 23, 1988

[54] SEISMIC SOURCE VIBRATOR HAVING IMPROVED SWEEP GENERATOR

[75] Inventors: John J. Sallas, Plano; George W. Wood, McKinney, both of Tex.

[73] Assignee: Texas Instruments Incorporated, Dallas, Tex.

[21] Appl. No.: 896,342

[22] Filed: Aug. 15, 1986

Related U.S. Application Data

[63] Continuation of Ser. No. 595,856, Apr. 2, 1984, abandoned.

[51] Int. Cl.[4] .............................................. G01V 1/28
[52] U.S. Cl. .................................. 367/189; 367/190; 181/113
[58] Field of Search ............... 181/101, 107, 108, 113, 181/114, 115, 119, 120, 121, 122, 139, 140, 141, 400, 401; 324/83 FE; 73/665-668; 364/421, 900; 367/143, 49, 50, 189, 190, 38

[56] References Cited

U.S. PATENT DOCUMENTS

| | | | |
|---|---|---|---|
| 2,878,999 | 3/1959 | Lindsey et al. | 367/38 X |
| 3,027,087 | 3/1962 | Blocher et al. | 364/421 X |
| 3,229,784 | 4/1966 | Lyons et al. | 181/107 |
| 3,257,623 | 6/1966 | See | 367/189 X |
| 3,886,493 | 5/1975 | Farr | 367/189 X |
| 3,895,343 | 7/1975 | Farr | 367/190 |
| 3,979,715 | 9/1976 | Katstedler et al. | 181/121 X |
| 4,056,163 | 11/1977 | Wood et al. | 181/113 |
| 4,173,749 | 11/1979 | Corthill | 367/190 |
| 4,493,067 | 1/1985 | Thomas et al. | 181/107 X |
| 4,512,001 | 4/1985 | Mayne et al. | 367/189 |
| 4,680,741 | 7/1987 | Wales et al. | 367/189 |

Primary Examiner—Deborah L. Kyle
Assistant Examiner—Brian S. Steinberger
Attorney, Agent, or Firm—Thomas G. Devine; Thomas W. DeMond; Melvin Sharp

[57] ABSTRACT

A sweep generator for a seismic source vibrator provides for any one of a variety of sweep signals governed by input parameters. Selected analytic functions may be entered which are solved to provide a plurality of sweep parameters. The sweep parameters may also be directly entered by the operator. The time and frequency sweep parameters (or time and amplitude) are then employed to generate polynomial coefficients for consecutive use in a polynomial equation. The polynomial equation is repeatedly solved to generate a series of instantaneous frequencies or instantaneous amplitudes which are applied to an analog wave synthesizer. The analog wave synthesizer then generates an approximation to the desired sweep signal for input to the hydraulic system of the vibrator.

12 Claims, 7 Drawing Sheets

SEISMIC SOURCE VIBRATOR HAVING IMPROVED SWEEP GENERATOR

This application is a continuation of application Ser. No. 595,856, filed Apr. 2, 1984, now abandoned.

BACKGROUND OF THE INVENTION

1. Field of the Invention

This invention relates to a sweep generator for a seismic source vibrator and more particularly to a sweep generator capable of generating desired sweep signals determined by input parameters.

2. Description of the Prior Art

Linear frequency envelopes for geophysical prospecting having been commonly used in the past and are presently being used.

In recent years there has been interest in the use of non-linear frequency envelopes such as logarithmic and quadratic. In the prior art, to generate the sweep signal at each vibrator, each vibrator control unit is equipped with various firmware subroutines for digital generation of each of the defined sweep modes. In most of those prior art systems, the various sweep modes are accessed via manual switches located on each vibrator control unit. The systems require large memories for storing all of the points necessary to define each desired sweep.

This invention provides for generating any desired sweep signal without changing firmware by providing in memory an interpolation equation for the computation of instantaneous frequency or amplitude values. To effect the change in the sweep mode to be used, a change in the input parameters is required.

BRIEF SUMMARY OF THE INVENTION

A seismic source vibrator has an analog wave synthesizer for generating a sweep signal and applying that sweep signal to the hydraulic system of the vibrator to cause the application of reciprocatory forces to the pad. The frequency and amplitude of the reciprocatory forces are dictated by the input from the analog wave synthesizer. An input device, such as a terminal or terminal keyboard is employed for inputting time and frequency pairs. Analytic functions may also be input and solved to provide the time and frequency pairs. Time and amplitude pairs may also be input.

A cubic spline technique is used to generate a series of frequency parameters at predetermined times for input to the analog wave synthesizer. A cubic spline polynomial interpolation equation has applied to it polynomial coefficients at predetermined intervals. The equation is solved to yield the instantaneous frequency parameter.

In one embodiment of this invention, a recording control unit is remotely located from a plurality of seismic source vibrators, each having a vibrator control unit. The polynomial coefficients are generated in the recording control unit and radio transmitted to each of the vibrator control units where the instantaneous frequency parameters are generated and applied to the vibrators.

The principal object of this invention is to provide a seismic source vibrator system wherein any desired sweep signal may be generated employing a digital computer having minimal memory requirements for storing the sweep parameters.

Another object of this invention is to provide a seismic source vibrator system wherein each vibrator control unit has a digital computer with a cubic spline polynomial interpolation equation stored in its memory to accommodate any time and frequency or time and amplitude pairs.

Still another object of this invention is to provide a seismic source vibrator system wherein analytic functions may be entered and solved to yield time and parameter pairs for generating spline coefficients for use in a cubic spline polynomial interpolation equation to provide sweep signal parameters for ultimate application to the hydraulic system of the vibrator.

These and other objects will be made evident in the detailed description that follows.

DETAILED DESCRIPTION OF THE INVENTION

This invention provides great flexibility in the generation of sweep signals for application in a seismic source vibrator. Through the use of cubic spline techniques, a minimal number of time and frequency points are generated to produce a desired sweep signal output. Time and frequency pairs are input to a digital computer which generates coefficients for application to a cubic spline polynomial interpolation equation. The equation is solved every four milliseconds, using the successive time period values. The output of the computer is applied to an analog wave synthesizer every four milliseconds which then generates a sweep signal whch approximates the input time and frequency pairs. It should be understood that time and amplitude pairs may be used as well.

Figure 1:
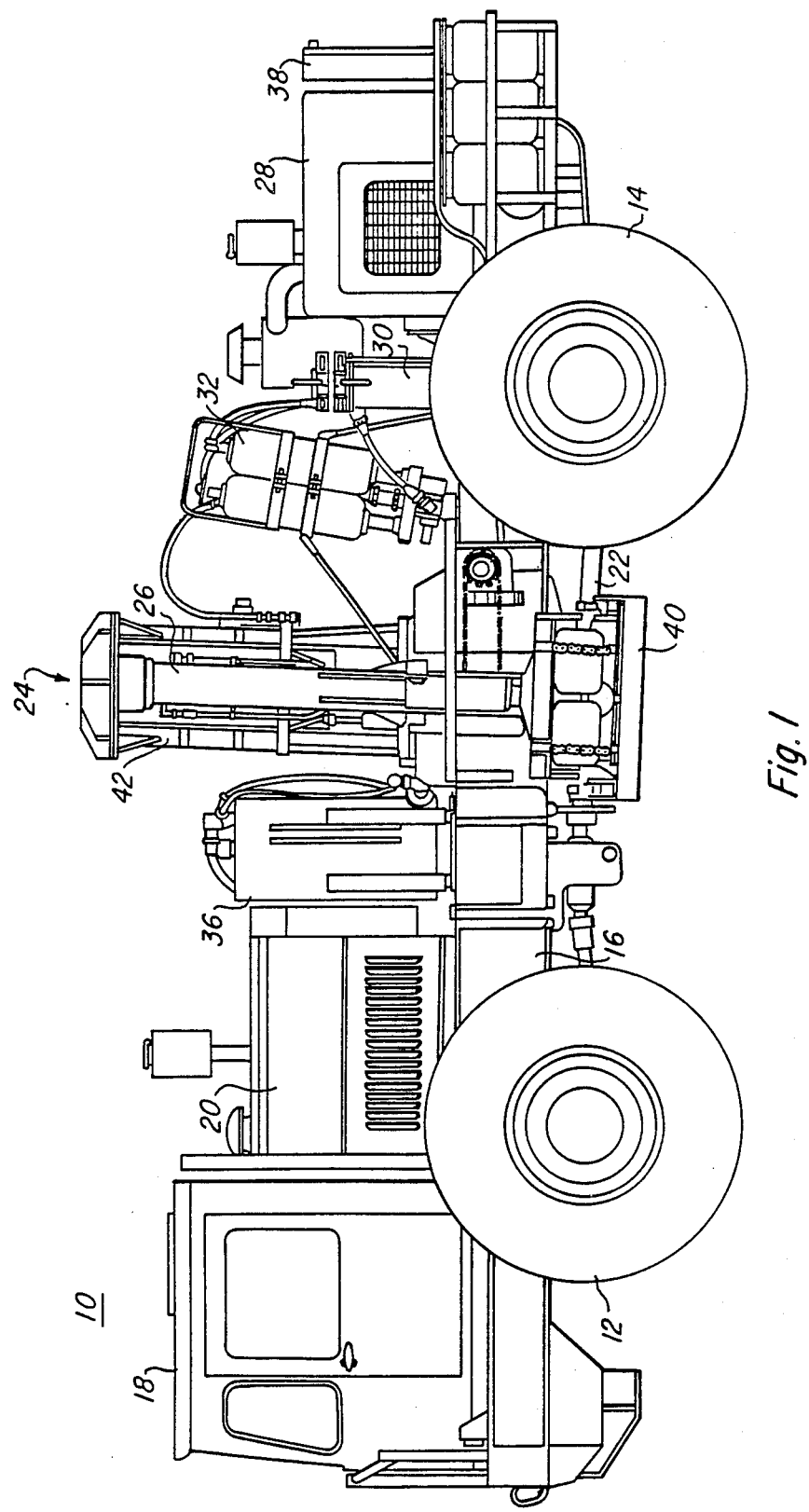
FIG. 1 is a side view of the seismic vibrator source mounted on a truck.

Referring first to FIG. 1, a vehicle 10 having front and rear wheels 12 and 14, respectively, supports a chassis comprised generally of frame channels 16, a cab 18, and a conventional engine 20. In the preferred embodiment of this invention, the vibrator control unit is primarily located within cab 18 and is not shown in FIG. 1. The recording control unit is located in a recording truck which is not shown. Vibrator assembly 24 is disposed between the front and rear wheels and connected to the frame member 16 of the truck by a lift system 26. A prime mover or engine 28, main hydraulic pump 30, high pressure accumulator system 32, hydraulic tank 36, hydraulic tank cooler 38 and associated hydraulic plumbing may be located on the frame member 16 as shown.

Figure 2:
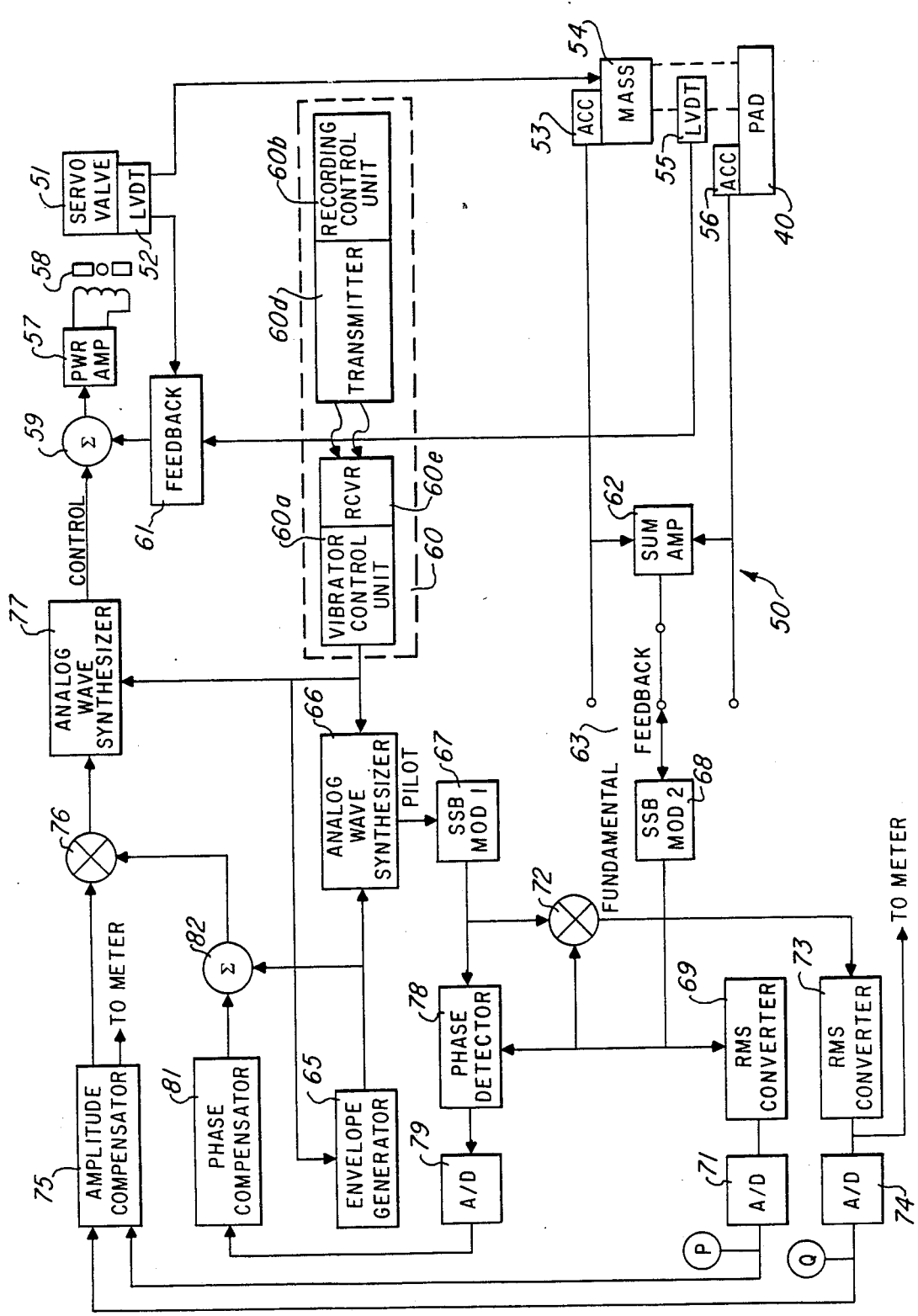
FIG. 2 is a block diagram of the control system for controlling the sweep signal of a seismic source vibrator.

FIG. 2 illustrates the combination of summer 59, power amplifier 57, servovalve motor 58, servovalve 51, mass 54, pad 40, linear variable-differential transducers 52 and 55, and feedback 61. This combination is in the prior art and is described in U.S. Pat. No. 3,929,206, entitled "Servo Hydraulic Transducer and Method of Operation" assigned to the assignee of this invention and incorporated herein by reference. Sweep control 60 is shown having its output connected to the input of analog wave synthesizer 77. Recording control unit 60b is shown connected to transmitter 60d which links with receiver 60e. Receiver 60e is connected to the vibrator control unit 60a.

Analog wave synthesizer 77 is known in the prior art and is described in detail in U.S. Pat. No. 3,979,715, entitled "Method and System for Achieving Vibrator Phase Lock", assigned to the assignee of this invention and incorporated herein by reference. There it is shown that the analog wave synthesizer comprises a binary rate multiplier, binary counters, a read-only memory and a D to A converter.

The remainder of the circuit here shown is a distortion limiting control system, not part of this invention. For reference purposes, patent application Ser. No. 435,124, filed on 10/18/82 and entitled "Vibrator Seismic Source Having Distortion Limiting Control System" and assigned to the assignee of this invention, claims and describes this control system.

Figure 3:
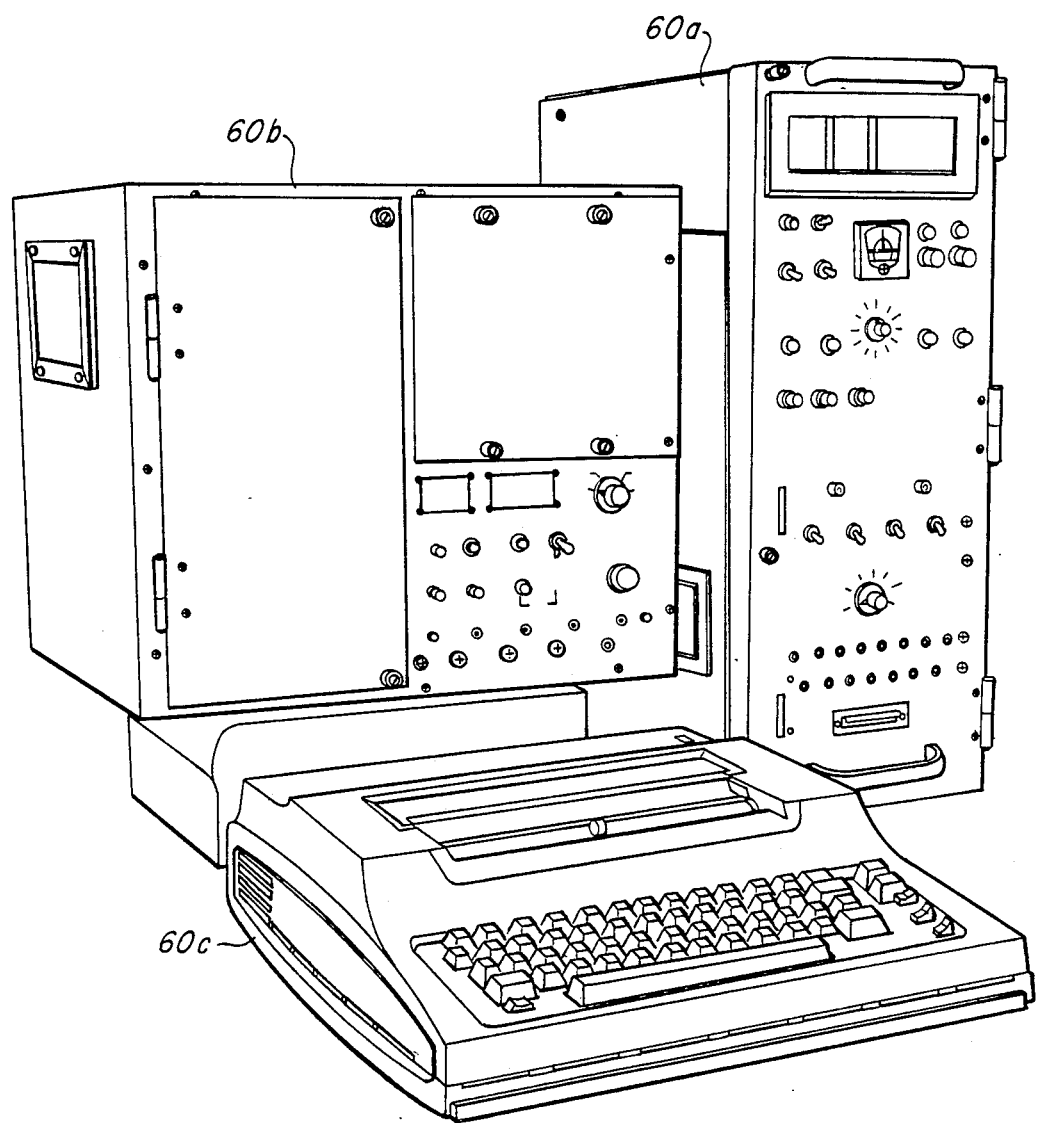
FIG. 3 is a perspective view of the input terminal, vibrator control units, and recording control unit for a seismic source vibrator system.

FIG. 3 illustrates vibrator control unit 60a, recording control unit 60b and terminal 60c. In this preferred embodiment, terminal 60c is described and claimed in U.S. Pat. No. 3,638,197 entitled "Electronic Printing Input-Output Station" assigned to the assignee of this invention and incorporated herein by reference. A wide variety of terminals, keyboards and computer input stations are available to the designer for this function. In this preferred embodiment, both the vibrator control unit 60a and the recording control unit 60b utilize microcomputer systems which employ Texas Instruments Incorporated Type 99000 micro controllers.

In one embodiment, recording control unit 60b and terminal 60c are located at one position and one or more vibrator control units 60a are located elsewhere. A well known radio link system connects unit 60a and 60b. The radio link selected in this preferred embodiment is a Motorola FM transmitter/receiver, Model "MI-TREK". In another embodiment, terminal 60c and vibrator control unit 60a may be used individually in a vibrator truck as in FIG. 1.

Terminal 60c receives inputs for determining the sweep signal. For example, in this preferred embodiment, 128 time and frequency pairs may be entered. As will be described later, these time and frequency pairs are utilized by the computer system in the recording control unit 60b to generate spline coefficients. The spline coefficients are transmitted via transmitter 60d to receiver 60a. Receiver 60a provides the spline coefficients to the digital computer in vibrator control unit 60a wherein the spline coefficients are sequentially applied to a cubic spline polynomial interpolation equation during sweep generation. In this preferred embodiment, the equation is solved every 4 milliseconds, as controlled by the digital computer.

In the second embodiment mentioned, the digital computer employed in the vibrator control unit 60a performs the functions, without any need for radio transmission.

Also, predetermined analytic functions may be entered through terminal 60c. For example, the expression $f = T^N$ may be entered and solved to provide up to 128 time and frequency pairs. A choice of 128 of these pairs is, of course, arbitrary and is easily accommodated.

Other complex functions may be employed to define a sweep signal. For example, functions involving coefficients as exponents may serve such a purpose. The polynomial equation of this preferred embodiment is therefore not intended to be limiting, but simply illustrative.

If it is desired to change analytic functions, or to add or substract analytic functions, it is obvious that the changes are made only in the recording control unit 60b. The vibrator control units 60a, in the individual vibrator trucks, need not be altered.

The cubic spline technique utilized herein requires the use of knots to define boundaries over which cubic segments operate. In the preferred embodiment, there are 11 knots defining 10 segments. The knots are empirically selected with the spacing differing substantially between certain of the analytic functions and those involving the input of time and frequency pairs. The mathematical formulation of the "least squares" fit spline follows:

The following algorithm is designed to compute a least squares approximation to a given set of points using cubic splines with a given set of knots. Let:

XK(1), XK(2), ..., XK(NXK) be the knot locations ordered such that XK(i) < XK(i+1);

X(1), X(2), ..., X(N) be the abscissae of the N points to be fit arranged in increasing order; and, Y(1), Y(2), ..., Y(N) be the ordinates of the N points to be fit.

The least squares cost function "J" to be minimized is:

$$J = \sum_{i=1}^{N} [Y(i) - S(i)]^2 * WT(i) \quad (1)$$

where, for $XK(j) \leq X(i) < XK(j+1)$ $$S(i) = a_j[X(i) - XK(j)]^3 + b_j[X(i) - XK(j)]^2 + c_j[X(i) - XK(j)] + d_j \quad (2)$$

and, $$WT(i) = \begin{cases} 3 * [X(2) - X(1)], & \text{for } i = 1 \\ [X(i+1) - X(i-1)], & \text{for } i = 2, 3, \ldots, N-1 \\ 3 * [X(N) - X(N-1)], & \text{for } i = N. \end{cases} \quad (3)$$

The objective becomes: minimize "J" with respect to the choice of spline coefficients $a_1, a_2, \ldots, a_{NXK-1}$; $b_1, b_2, \ldots, b_{NXK-1}$; $c_1, c_2, \ldots, c_{NXK-1}$; and $d_1, d_2, \ldots, d_{NXK-1}$. In addition an added constraint is placed on the problem, i.e. continuity at the knot and continuity of the derivative. Smoothness of the knots implies:

$$c_{j+1} = 3*a_j[XK(j+1)-XK(j)]^2 + 2*b_j[XK(j+1)-XK(j)] + c_j \quad (4)$$

$$d_{j+1} = a_j[XK(j+1)-XK(j)]^3 + b_j[XK(j+1)-XK(j)]^2 + c_j[XK(j+1)-XK(j)] + d_j. \quad (5)$$

Let:

$$H_j = XK(j+1) - XK(j). \quad (6)$$

An alternate expression for equation (4) and (5) can be computed to yield respectively equations (7) and (8).

$$c_{j+1} = c_1 + \sum_{k=1}^{j} [3 * a_k * H_k^2 + 2 * b_k * H_k] \quad (7)$$

$$d_{j+1} = d_1 + \sum_{k=1}^{j} [a_k * H_k^3 + b_k * H_k^2 + c_k * H_k] \quad (8)$$

The smoothness constraint fixes the values of $c_2$ through $c_{NXK-1}$ and $d_2$ through $d_{NXK-1}$ whose values can be determined by evaluating equations (7) and (8).

Differentiation of the cost function "J" with respect to the spline coefficients yields (from this point forward, without loss of generality let NXK=5):

$$\frac{dJ}{da_j} = -\sum_{i=1}^{N}[Y(i) - S(i)] * WT(i) * \frac{dS(i)}{da_j} \qquad (9)$$

$$\frac{dJ}{db_j} = -\sum_{i=1}^{N}[Y(i) - S(i)] * WT(i) * \frac{dS(i)}{db_j} \qquad (10)$$

$$\frac{dJ}{dc_1} = -\sum_{i=1}^{N}[Y(i) - S(i)] * WT(i) * \frac{dS(i)}{dc_1} \qquad (11)$$

$$\frac{dJ}{dd_1} = -\sum_{i=1}^{N}[Y(i) - S(i)] * WT(i) * \frac{dS(i)}{dd_1} \qquad (12)$$

with, $$\frac{dS(i)}{da_j} = \begin{cases} 0, & \text{for } X(i) < XK(j) \\ [X(i) - XK(j)]^3, & \text{for } XK(j) \leq X(i) < XK(j+1) \\ 3 * H_j^2 * [X(1) - XK(j+1)] + H_j^3, & \text{elsewhere.} \end{cases} \qquad (13)$$

$$\frac{dS(i)}{db_j} = \begin{cases} 0, & \text{for } X(i) < XK(j) \\ [X(i) - XK(j)]^2, & \text{for } XK(j) \leq X(i) < XK(j+1) \\ 2*[XK(j+1) - XK(j)] * [X(i) - XK(j+1)] + \\ \quad [XK(j+1) - XK(j)]^2, & \text{for } XK(j+1) \leq X(i). \end{cases} \qquad (14)$$

$$\frac{dS(i)}{dc_1} = [X(i) - XK(1)] \qquad (15)$$

$$\frac{dS(i)}{dd_1} = 1 \qquad (16)$$

Setting the derivatives of the cost function with respect to the spline coefficients and solving the resulting equations simultaneously yields a set of coefficients with minimum cost.

$$\sum_{i=1}^{N} WT(i) * Y(i) * \frac{dS(i)}{da_j} = \sum_{i=1}^{N} WT(i) * Y(i) * \frac{dS(i)}{da_j}, \qquad (17)$$
for $j = 1, 2 \ldots 4$ $$\sum_{i=1}^{N} WT(i) * Y(i) * \frac{dS(i)}{db_j} = \sum_{i=1}^{N} WT(i) * Y(i) * \frac{dS(i)}{db_j}, \qquad (18)$$
for $j = 1, 2 \ldots 4$ $$\sum_{i=1}^{N} WT(i) * Y(i) * \frac{dS(i)}{dc_1} = \sum_{i=1}^{N} WT(i) * Y(i) * \frac{dS(i)}{dc_1}, \qquad (19)$$

$$\sum_{i=1}^{N} WT(i) * Y(i) * \frac{dS(i)}{dd_1} = \sum_{i=1}^{N} WT(i) * Y(i) * \frac{dS(i)}{dd_1}, \qquad (20)$$

The above equations rewritten in matrix form become after appropriate substitution of equations 13 through 16.

$$\begin{bmatrix} GRD(1) \\ GRD(2) \\ GRD(3) \\ GRD(4) \\ GRD(5) \\ GRD(6) \\ GRD(7) \\ GRD(8) \\ GRD(9) \\ GRD(10) \end{bmatrix} = \begin{bmatrix} GR2D(1,1) & GR2D(1,2) & \ldots & GR2D(1,10) \\ GR2D(2,1) & GR2D(2,2) & \ldots & GR2D(2,10) \\ . & & & . \\ . & & & . \\ . & & & . \\ GR2D(10,1) & GR2D(10,2) & \ldots & GR2D(10,10) \end{bmatrix} \begin{bmatrix} a_1 \\ a_2 \\ a_3 \\ a_4 \\ b_1 \\ b_2 \\ b_3 \\ b_4 \\ c_1 \\ d_1 \end{bmatrix} \qquad (21)$$

Inversion of the GR2D matrix yields the spline coefficient solution. The matrix GR2D matrix is symmetric and its inverse can be obtained through use of special matrix inversion procedures such as the Cholesky method. The values obtained for $a_1$ through $a_4$, $b_1$ through $b_4$, $c_1$ and $d_1$ are substituted into (7) and (8) to find $c_2$ through $c_4$ and $d_2$ through $d_4$.

$$[COEFFICIENTS] = [GR2D^{-1}] * [GRD]. \quad (22)$$

Figure 4A:
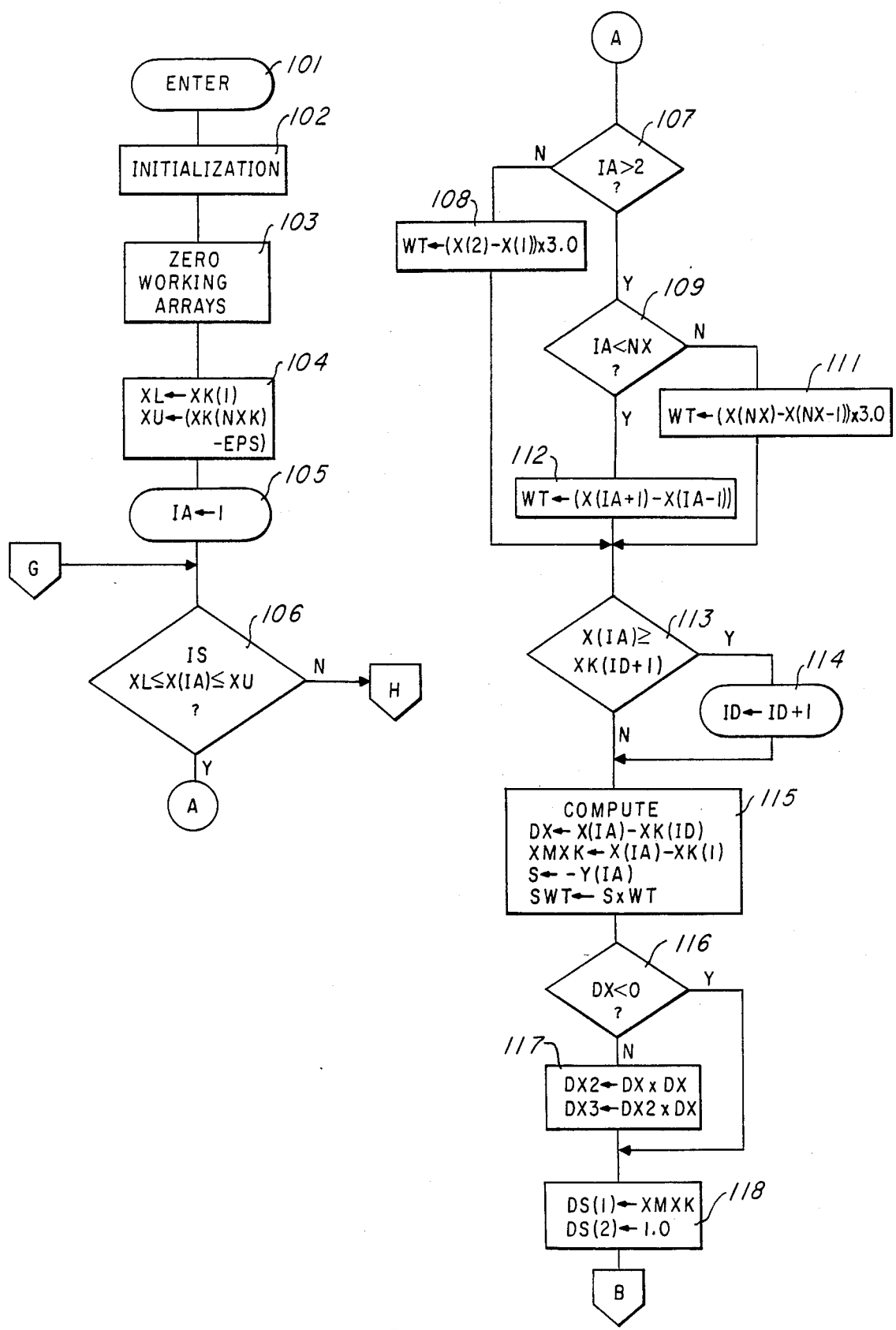
FIGS. 4a–4d form a flowchart of generating frequency parameters at specific time increments for input to an analog wave synthesizer for generation of a sweep signal.
Figure 4B:
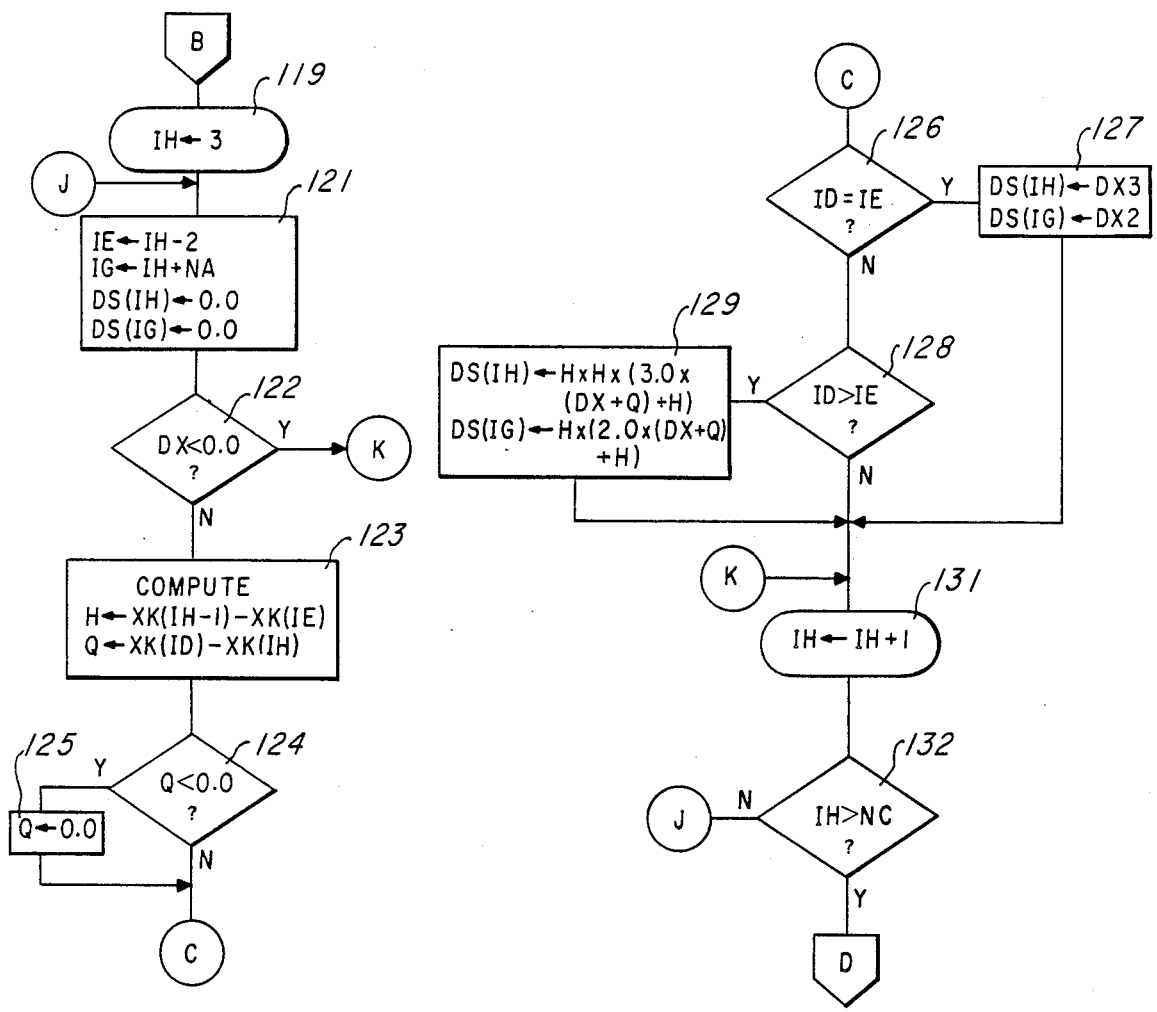

Turning now to the flowchart depicted in FIGS. 4a–4d, reference should be made as well to the preceding mathematical formulation. In FIG. 4a, an initialization is done through blocks 101–105, with decision block 106 determining whether the range is correct.

Decision blocks 107 and 109 and block 108, 111 and 112 illustrate the evaluation of equation 3. Blocks 113–118 in FIG. 4a, blocks 119, 121–125, 126–129, 131, 132 in FIG. 4b and blocks 133 and 134 in FIG. 4c all illustrate evaluating the GRD vector as shown in the preceding mathematical formulation. The computations and movement of data are as shown in these FIGS. 4a–4c.

Figure 4C:
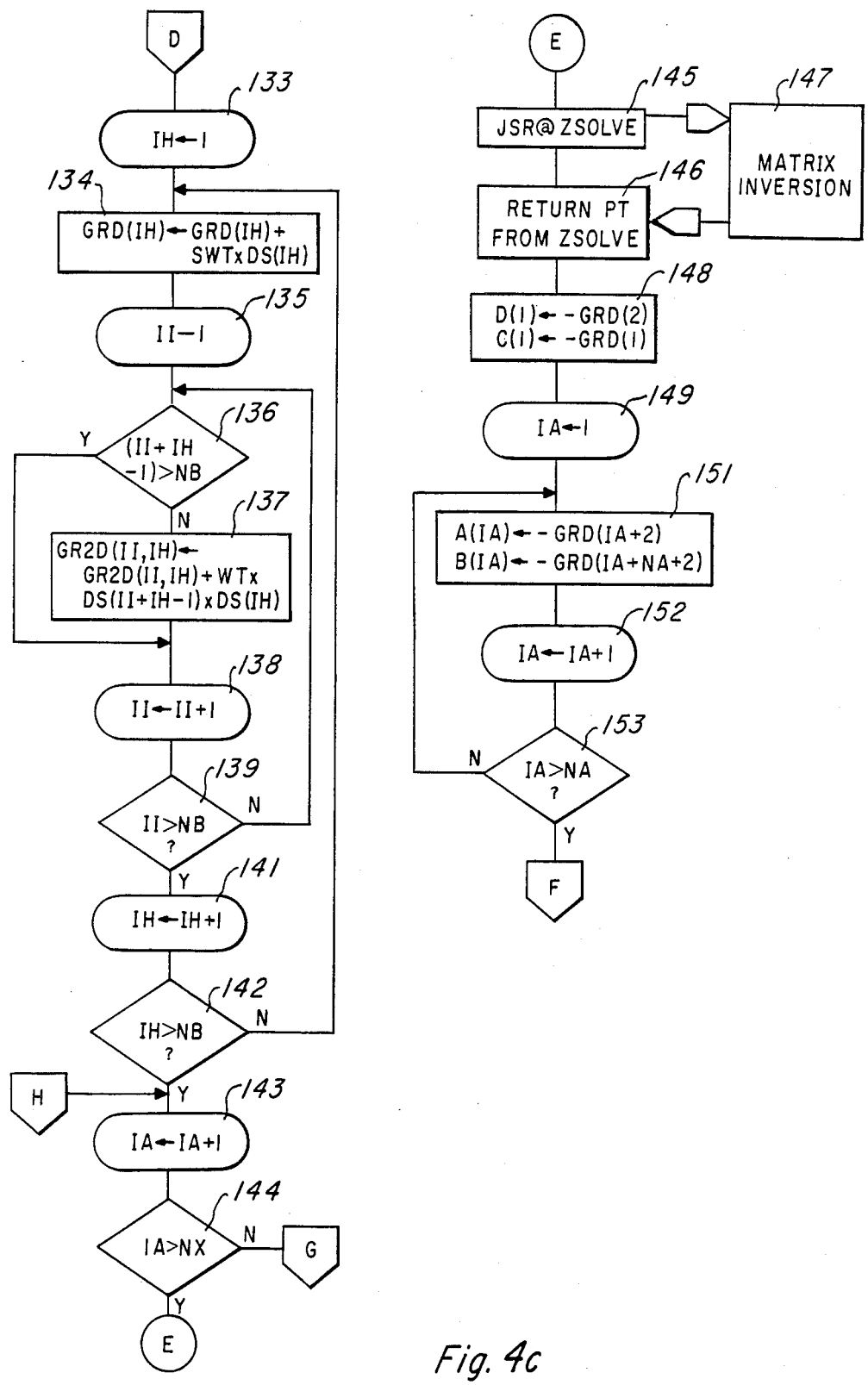
Figure 4D:
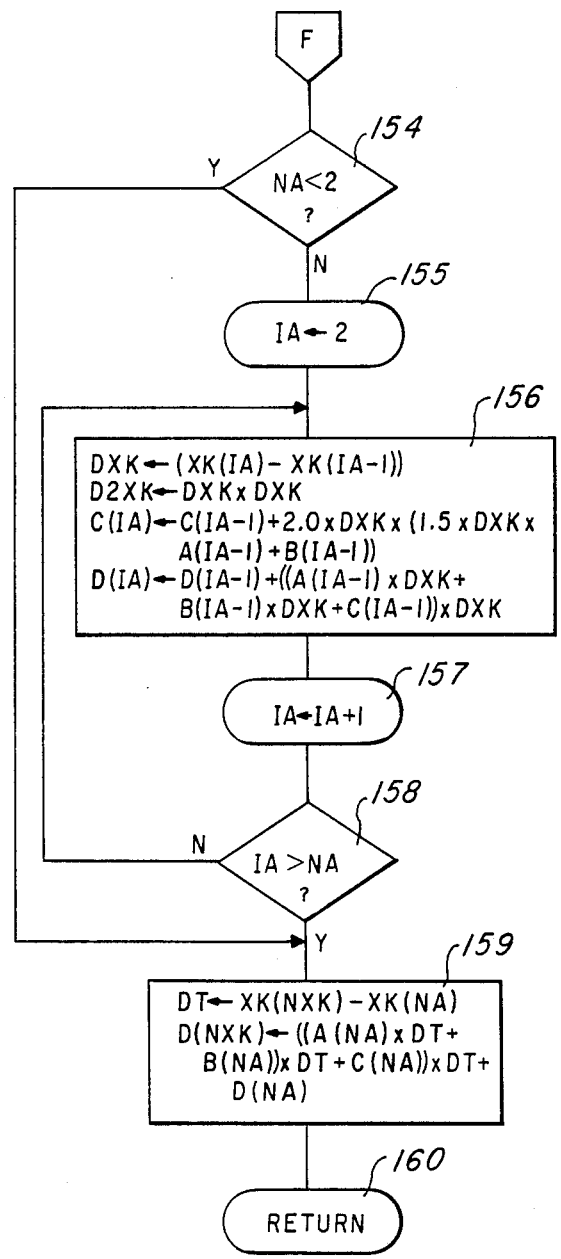

Blocks 135–139 and 141–144 of FIG. 4c illustrate the evaluation of the GR2D vector. These blocks describe the operations performed by the digital computer and perform the functions as set out in FIG. 4c.

Blocks 145–147 illustrate the solving of equation (22). The main element in this solution is performed in matrix inversion 147. The matrix inversion is simply a method for solving the linear equations as set out in the mathematical formulation. The inversion is done via a Gauss elimination which makes use of a Cholesky factorization. This particular method is shown beginning on Page 256 of "A Practical Guide to Splines" by Carl deBoor and is incorporated herein by reference.

Blocks 149 and 151–153 simply illustrate the transferring of coefficients in the computer memory to enable transfer of the coefficients for sequential placement in equation (2). Blocks 154–159 evaluate equations (7) and (8) to find $c_2$ through $c_{NXK-1}$ and $d_2$ through $d_{NXK-1}$, which are also transferred for sequential placement in equation (2). When sweep generation is commenced, coefficients $a_1$–$d_1$ are entered and the equation is solved. Four milliseconds later, the equation is again solved. When the segment is completed at the knot, coefficients $a_2$–$d_2$ are entered and the equation again solved every four milliseconds, until the next knot. The output frequencies are then applied to analog wave synthesizer 77 of FIG. 2 which provides a sweep signal through summer 59 to the power amplifier 57. The power amplifier 57 inputs the servovalve 51 which ultimately causes the pad 40 to vibrate at frequencies in accordance with the desired time and frequency pairs intially entered through terminal 60c. As indicated above, amplitudes could have been substituted for frequencies.

Although the present invention has been shown and illustrated in terms of a specific method and apparatus, it will be apparent that changes or modifications can be made without departing from the spirit and scope of the invention as defined by the appended claims.

We claim:

1. An improved method of providing a desired non-linear sweep signal in a seismic source vibrator for generating reciprocatory forces, adapted to receive analytical mathematical functions defining the desired sweep signal having an analog wave synthesizer, a hydraulic system responsive to the analog wave synthesizer, and a pad for imparting acoustic energy into the earth, activated by the hydraulic system means, comprising the steps of:
   (a) inputting a plurality of pairs of time and amplitude for defining a desired sweep signal;
   (b) determining a plurality of polynomial coefficients from the plurality of pairs of amplitude parameters time and parameter;
   (c) generating a time series of instantaneous parameters based on the coefficients; and
   (d) providing the instantaneous parameters to the analog wave synthesizer for causing the hydraulic system to apply reciprocatory forces to the pad, with the desired sweep signal.

2. The method of claim 1 further comprising the initial steps of inputting an analytic mathematical function; and
   solving the analytic mathematical function repeatedly for differing values of a selected variable to provide the pairs of time and a second parameter.

3. A seismic source vibrator for generating reciprocatory forces adapted to receive analytic mathematical functions defining a desired non-linear sweep signal, and having an analog wave synthesizer for providing an analog output, comprising:
   (a) at least one pad for imparting acoustic energy into the earth;
   (b) hydraulic system means connected to receive the output of the analog wave synthesizer to cause the application of the reciprocatory forces to the pad;
   (c) input means for inputting a plurality of pairs of time and amplitude parameters for defining a desired non-linear sweep signal to be applied to the hydraulic system means;
   (d) coefficient generating means for receiving the pairs of time and amplitude parameters, and for mathematically generating therefrom a plurality of polynomial coefficients for use in defining the desired non-linear sweep signal; and
   (e) parameter generating means for receiving the coefficients for mathematically generating a time series of instantaneous numerical parameters and for providing the instantaneous numerical parameters to the analog wave synthesizer to generate the desired non-linear sweep signal for input to the hydraulic system.

4. A seismic source vibrator for generating reciprocatory forces adapted to receive analytic mathematical functions defining a desired non-linear sweep signal, and having an analog wave synthesizer for providing an analog output, comprising:
   (a) at least one pad for imparting acoustic energy into the earth;
   (b) hydraulic system means connected to receive the output of the analog wave synthesizer to cause the application of the reciprocatory forces to the pad;
   (c) input means for inputting a plurality of pairs of time and frequency parameters for defining a desired non-linear sweep signal to be applied to the hydraulic system means;
   (d) coefficient generating means for receiving the pairs of parameters and for mathematically generating therefrom a plurality of polynomial coefficients for use in defining the desired non-linear sweep signal; and
   (e) parameter generating means for receiving the coefficients for mathematically generating a time series of instantaneous numerical parameters therefrom and for providing the instantaneous numerical parameters to the analog wave synthesizer to generate the desired non-linear sweep signal for input to the hydraulic system.

5. The vibrator of claim 4 wherein the coefficient generating means comprises means for solving simultaneous equations, defined by the pairs of time and frequency, to provide the coefficients.

6. The vibrator of claim 5 wherein the means for receiving the coefficients comprises a polynomial equation to which the coefficients are time sequentially fit, and means for solving the equation to provide the frequency instantaneous parameters in time sequential order.

7. A seismic source vibrator system comprising:
(a) input means for inputting a plurality of pairs of time and amplitude parameters for defining a desired sweep signal and for inputting analytic mathematical functions defining a desired non-linear sweep signal;
(b) recording control unit means for receiving the pairs of parameters and for generating therefrom a plurality of numerical polynomial coefficients for use in defining the desired non-linear sweep signal;
(c) wireless transmitter means connected to the recording control unit means for transmitting the coefficients; and
(d) at least one seismic source vibrator including:
  (i) at least one pad for imparting acoustic energy into the earth;
  (ii) analog wave synthesizer means, having an output, for generating the desired non-linear sweep signal;
  (iii) hydraulic system means connected to receive the output of the analog wave synthesizer to cause the application of the reciprocatory forces to the pad;
  (iv) receiver means for receiving the coefficients from the wireless transmission means; and
  (v) vibrator control unit means connected to the receiver means, for receiving the coefficients for generating a time series of instantaneous numerical parameters therefrom and for providing the instantaneous numerical parameters to the analog wave synthesizer to generate the desired non-linear sweep signal for input to the hydraulic system means.

8. A seismic source vibrator system comprising:
(a) input means for inputting a plurality of pairs of time and frequency parameters for defining a desired sweep signal and for inputting analytic mathematical functions defining a desired non-linear sweep signal;
(b) recording control unit means for receiving the pairs of parameters and for generating therefrom a plurality of numerical polynomial coefficients for use in defining the desired non-linear sweep signal;
(c) wireless transmitter means connected to the recording control unit means for transmitting the coefficients; and
(d) at least one seismic source vibrator including:
  (i) at least one pad for imparting acoustic energy into the earth;
  (ii) analog wave synthesizer means for generating the desired non-linear sweep signal;
  (iii) hydraulic system means connected to receive the output of the analog wave synthesizer to cause the application of the reciprocatory forces to the pad;
  (iv) receiver means for receiving the coefficients from the wireless transmission means; and
  (v) vibrator control unit means connected to the receiver means, for receiving the coefficients for generating a time series of instantaneous numerical parameters therefrom and for providing the instantaneous numerical parameters to the analog wave synthesizer to generate the desired non-linear sweep signal for input to the hydraulic system means.

9. The vibrator of claim 8 wherein the recording control unit means comprises means for solving simultaneous equation defined by the pairs of time and frequency to provide the coefficients.

10. The vibrator of claim 9 wherein the vibrator control unit means comprises a polynomial equation to which the coefficients are time sequentially fit, and means for solving the polynomial equation to provide the frequency instantaneous parameters in time sequential order.

11. An improved method of providing a desired non-linear sweep signal in a seismic source vibrator for generating reciprocatory forces, adapted to receive analytical mathematical functions defining the desired sweep signal having an analog wave synthesizer, a hydraulic system responsive to the analog wave synthesizer, and a pad for imparting acoustic energy into the earth, activated by the hydraulic system, comprising the steps of:
(a) inputting a plurality of pairs of time and frequency parameters for defining a desired non-linear sweep signal;
(b) determining a plurality of polynomial coefficients from the plurality of pairs of time and frequency parameters;
(c) generating a time series of instantaneous parameters based on the coefficients; and
(d) providing the instantaneous parameters to the analog wave synthesizer for causing the hydraulic system to apply reciprocatory forces to the pad, with the desired sweep signal.

12. The method of claim 11 further comprising the initial steps of inputting an analytic mathematical function; and
solving the analytic mathematical function repeatedly for differing values of a selected variable to provide the pairs of time and frequency parameters.

* * * * *